(12) United States Patent
Cappeller

(10) Patent No.: US 12,535,118 B2
(45) Date of Patent: Jan. 27, 2026

(54) GAS SPRING AND RELATIVE SAFETY SYSTEM

(71) Applicant: Cappeller Futura Srl, Cartigliano (IT)

(72) Inventor: Alessandro Cappeller, Cartigliano (IT)

(73) Assignee: Cappeller Futura S.r.l., Cartigliano (IT)

( * ) Notice: Subject to any disclaimer, the term of this patent is extended or adjusted under 35 U.S.C. 154(b) by 390 days.

(21) Appl. No.: 18/025,661

(22) PCT Filed: Sep. 7, 2021

(86) PCT No.: PCT/IT2021/050274
§ 371 (c)(1),
(2) Date: Mar. 10, 2023

(87) PCT Pub. No.: WO2022/054116
PCT Pub. Date: Mar. 17, 2022

(65) Prior Publication Data
US 2023/0349439 A1    Nov. 2, 2023

(30) Foreign Application Priority Data

Sep. 11, 2020 (IT) ........................ 102020000021541

(51) Int. Cl.
*F16F 9/02*      (2006.01)
*F16F 9/32*      (2006.01)
(Continued)

(52) U.S. Cl.
CPC .......... *F16F 9/0218* (2013.01); *F16F 9/0236* (2013.01); *F16F 9/0281* (2013.01);
(Continued)

(58) Field of Classification Search
CPC ...... F16F 9/0218; F16F 9/0236; F16F 9/0281; F16F 9/3235; F16F 9/362; F16F 9/58
(Continued)

(56) References Cited

U.S. PATENT DOCUMENTS

| 7,331,570 B2 * | 2/2008 | Stenquist | F16F 9/0218 |
| | | | 267/64.11 |
| 7,559,542 B2 * | 7/2009 | Cotter | F16F 9/585 |
| | | | 267/64.19 |

(Continued)

FOREIGN PATENT DOCUMENTS

| EP | 2778465 A1 * | 9/2014 | F16F 9/3235 |
| EP | 2933524 A1 * | 10/2015 | F16F 9/0209 |

(Continued)

*Primary Examiner* — Thomas W Irvin

(57) ABSTRACT

Described is a gas spring (200), comprising a guide (2), having an outer surface (212), a slider (1), defining with said guide (2) at least one chamber (11) containing pressurised gas, said slider (1) being slidably connected to said guide (2) in such a way as to have a maximum stroke, of expansion, wherein said guide (2) is partially extracted from said slider (1), and a maximum stroke, of compression, characterised in that it comprises a bushing (3), positioned between said slider (1) and said guide (2), comprising sealing means for the tightness of the chamber (11), and
removably coupled and so as to move integrally with said slider (1) up to said maximum stroke, in such a way that, when said slider (1) slides with respect to said guide (2) beyond said maximum stroke, said bushing (3) decouples from said slider (1) so as to eliminate the seal of the chamber (11).

6 Claims, 10 Drawing Sheets

(51) Int. Cl.
*F16F 9/36* (2006.01)
*F16F 9/58* (2006.01)

(52) U.S. Cl.
CPC ............ *F16F 9/3235* (2013.01); *F16F 9/362* (2013.01); *F16F 9/58* (2013.01); *F16F 2222/126* (2013.01); *F16F 2230/0023* (2013.01); *F16F 2230/007* (2013.01); *F16F 2230/02* (2013.01); *F16F 2230/24* (2013.01); *F16F 2230/30* (2013.01)

(58) Field of Classification Search
USPC .................................................. 267/118, 124
See application file for complete search history.

(56) References Cited

U.S. PATENT DOCUMENTS

| | | | | |
|---|---|---|---|---|
| 8,490,763 | B2* | 7/2013 | Vandine | F16F 9/362 |
| | | | | 267/129 |
| 8,776,964 | B2* | 7/2014 | Cappeller | F16F 9/346 |
| | | | | 267/64.11 |
| 9,291,265 | B2* | 3/2016 | Cappeller | F16F 9/3242 |
| 9,447,834 | B2* | 9/2016 | Cotter | F16F 9/0281 |
| 9,551,394 | B2* | 1/2017 | Cotter | F16F 9/02 |
| 9,726,287 | B2* | 8/2017 | Cappeller | F16F 9/36 |
| 9,874,281 | B2* | 1/2018 | Cappeller | F16F 9/435 |
| 11,460,087 | B2* | 10/2022 | Cotter | F16F 9/0209 |
| 11,959,530 | B2* | 4/2024 | Cotter | F16K 17/40 |
| 12,066,077 | B2* | 8/2024 | Cotter | F16F 9/0209 |
| 12,152,653 | B2* | 11/2024 | Cotter | F16F 9/3242 |
| 2006/0055093 | A1* | 3/2006 | Cotter | F16F 9/0218 |
| | | | | 267/64.11 |
| 2013/0228069 | A1* | 9/2013 | Cappeller | F16F 9/3242 |
| | | | | 92/169.1 |
| 2014/0191451 | A1* | 7/2014 | Moss | F16F 9/43 |
| | | | | 137/68.19 |
| 2014/0191452 | A1* | 7/2014 | Moss | F16F 9/43 |
| | | | | 137/68.23 |
| 2015/0076753 | A1* | 3/2015 | Cotter | F16F 9/435 |
| | | | | 267/124 |
| 2015/0137435 | A1* | 5/2015 | Cotter | F16F 9/435 |
| | | | | 267/119 |
| 2022/0275846 | A1* | 9/2022 | Cappeller | F16F 9/3214 |
| 2022/0325770 | A1* | 10/2022 | Bordin | F16F 9/0218 |

FOREIGN PATENT DOCUMENTS

| | | | | |
|---|---|---|---|---|
| EP | | 3051173 A2 * | 8/2016 | ............ F16F 9/0218 |
| EP | | 3236102 A1 * | 10/2017 | ............ F16F 9/0281 |

* cited by examiner

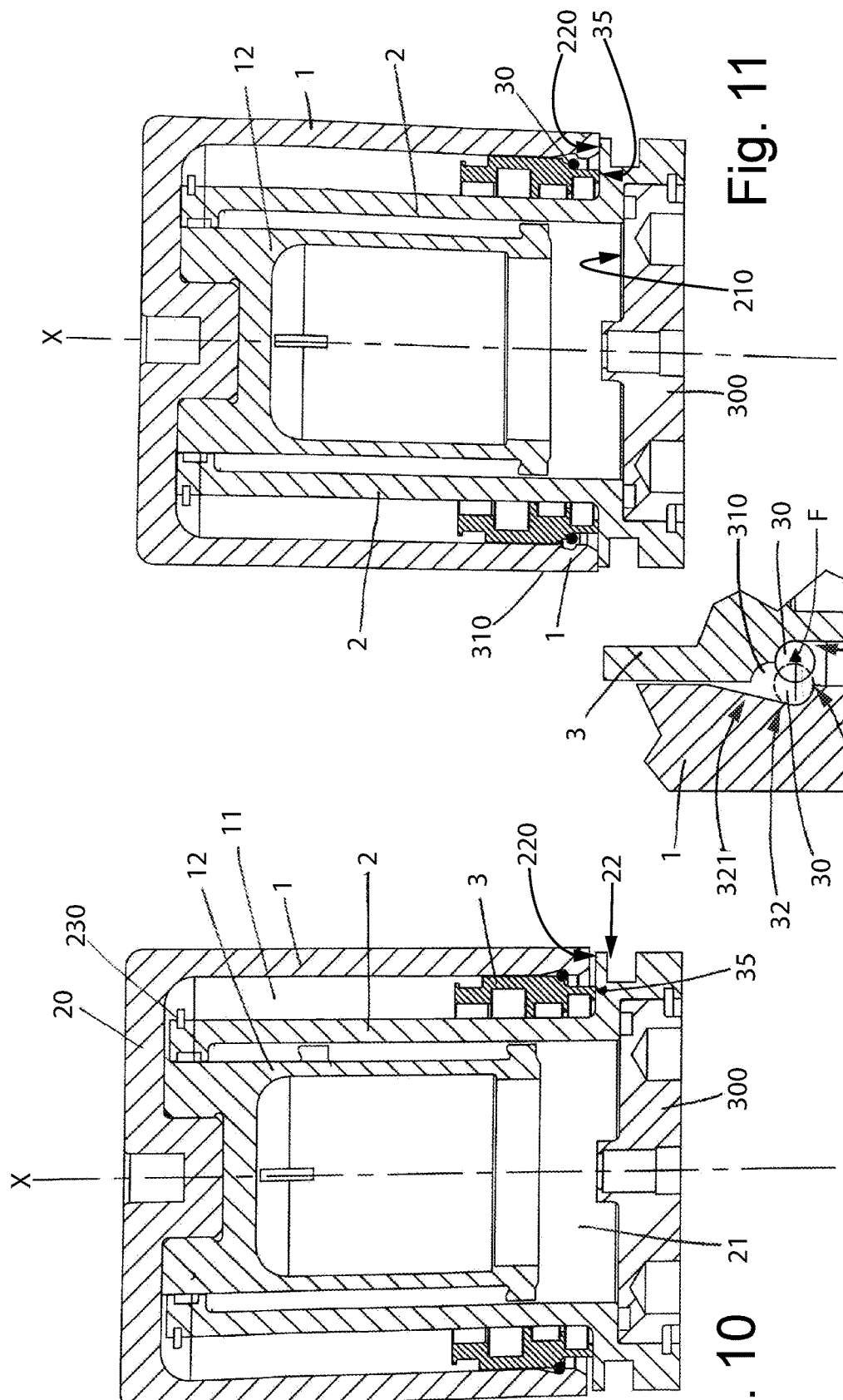

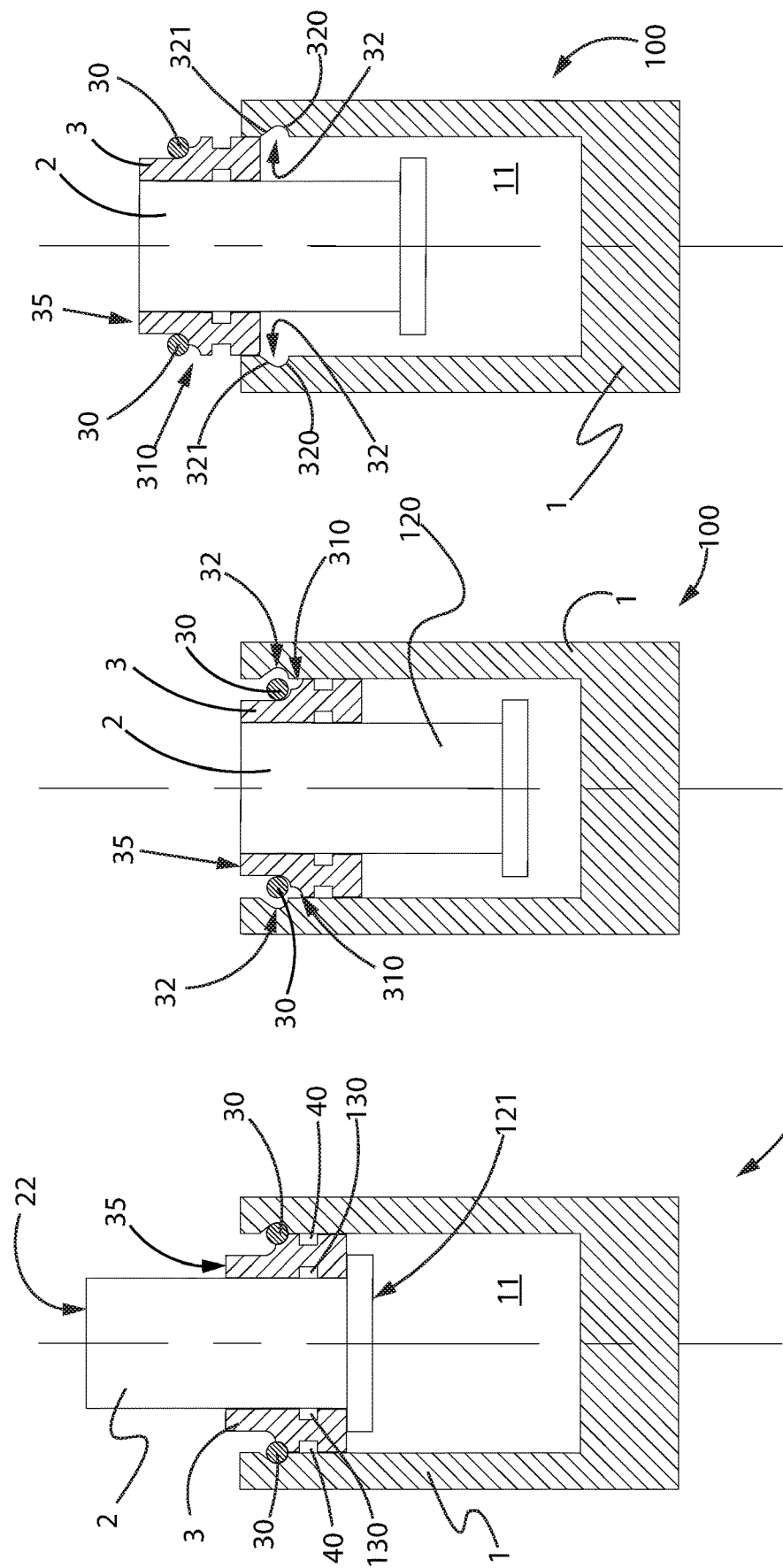

GAS SPRING AND RELATIVE SAFETY SYSTEM

RELATED APPLICATIONS

This application is a National Phase of PCT Patent Application No. PCT/IT2021/050274 having International filing date of Sep. 7, 2021, which claims the benefit of priority of Italy Patent Application No. 102020000021541 filed on Sep. 11, 2020. The contents of the above applications are all incorporated by reference as if fully set forth herein in their entirety.

FIELD AND BACKGROUND OF THE INVENTION

This invention relates to a gas spring and a relative safety system.

The invention is part of the wider field of the production of gas springs, also known as nitrogen cylinders.

Gas springs normally comprise:
a fixed outer body, called for example a cylinder or jacket;
a mobile component, also called stem;
possibly guide means for the stem;
one or more sealing elements;
a component for introducing the gas into the cylinder, also called filling valve.

Currently, one of the most important aspects in the sector is that relating to the safety of these mechanical devices.

As is known, in fact, the improvement in the efficiency of the thrust elements in general has caused over time an increase in the maximum loads that can be supported by the gas springs. This is almost always achieved thanks to an increase in the pressure of the gas present inside the elements of the springs themselves.

The pressures that modern gas springs can tolerate even reach initial values of 150-180 bar, and must be taken into due consideration by the designers, the production and/or maintenance personnel, and by the users as part of their activities.

It is however necessary to avoid damage or injury caused by the springs themselves, and particular attention must be paid to those categories of defects that often affect a component, without however causing immediate breakage.

For example, small defects and/or which are not detectable by visual inspection do not allow a user to recognise a defective gas spring, nor, at least, to implement precautionary measures, such as those, for example, of replacing the damaged part or even send the piece for disposal.

Another problem is due to the fact that, when the known springs currently enter compression, the piston creates an additional volume at the opposite side of the chamber, between the piston itself and the upper guide band: consequently, a negative pressure is generated in such a space, which can recall oils or other substances, which, by subtracting useful volume, would lower the efficiency of the spring, even damaging it over time.

The volume subtracted from the oils also causes an increase in gas pressure inside the chamber, which can be very dangerous during operation.

Considering, furthermore, that gas springs usually withstand cyclical loads, the formation of unwanted cracks makes them particularly subject to the phenomenon of fatigue failure.

All these problems are often the cause of unexpected and sudden accidents, with respect to which the personnel and operators who are in the vicinity of the spring that breaks run quite serious risks. The consequences of such accidents can be very serious, causing injuries of varying degrees and even with a fatal outcome.

Since the evolution of these phenomena is difficult to assess, there is a strongly felt need in the sector to guarantee adequate safety conditions regardless of the technologies available to the operators in the sector for carrying out checks of various kinds.

The prevention of accidents due to sudden and unpredictable breakages, by means of investigation techniques to be used before putting the spring into operation, therefore plays a fundamental role.

However, this approach is not always easy to implement, and it is not without errors or oversights.

It is not uncommon for the springs, once they are put into continuous operation, to suffer damage and deteriorate, as a result of normal wear, or following use in service conditions which are improper or which were not taken into account in the design phase, but also due to completely accidental events.

Such dangerous injuries can be generated, for example, as a result of unwanted impacts, and, if not promptly identified, can cause even serious accidents.

As a first particularly relevant example, the case in which a spring is at the end of the compression phase can be considered.

In this case, it is desirable to avoid contact between the two main parts of the spring when the latter approximates the bottom dead center configuration, that is to say, the configuration in which the sliding element inside the hollow casing containing the gas approaches the inner wall of the casing itself.

Further, the opposite situation can be considered, with the spring being towards the end of the expansion phase and approaching the top dead centre configuration.

Normally, some devices are already provided in gas springs to prevent the two sliding elements from slipping out of each other, such as pistons equipped with a locking head, so as not to allow the stroke of the spring to continue beyond a maximum extension limit.

However, in the event of damage and/or malfunctions to these components, the risk that the sliding elements can come off, with all the relative consequences, increases considerably.

Another drawback of current solutions is that, once the spring is assembled, the components designed to ensure safety which are located inside the gas containment chamber cannot be easily inspected for cracks, apart from after having brought the internal pressure of the spring to the level of the atmospheric pressure and disassembling it.

This operation involves prolonged working times and at times the spring can become unusable after checking, with the result that it is often preferable to directly replace the spring that is suspected to be faulty, without however having certain proof that it is. Such dangerous situations can occur much more easily if the springs are designed in such a way as to avoid detachment between the sliding and/or sealing elements.

Following impacts and/or unwanted contacts between its sliding or sealing parts, the springs can suffer fractures or cracks, even of slight entity, and which are not detectable during a routine visual inspection.

However, the springs appear intact and continue to be stressed, causing fractures to propagate and making them very dangerous to use.

The technical device described here causes an immediate and total loss of tightness and the disengagement of the sliding elements, preventing the continued use of a possibly damaged and, therefore, dangerous spring.

Examples of known springs which suffer from the above-mentioned drawbacks can be found in patent documents EP3051173A2, EP2778465A1 and EP3236102A1.

The springs described in these patent documents are manufactured in such a way as not to allow the sliding elements to disengage themselves, consequently they do not guarantee the total escape of the gas from the chamber.

All the locking rings present are designed to remain elastically expanded inside the initial seat they belong to, and the bushings located in an intermediate position between the two main sliding elements cannot displace them to cause the detachment of the elements themselves.

It is also envisaged that one or more components must break when the over-stroke in the compression phase is reached, exposing the surrounding environment and personnel, as well as the spring itself, to risks deriving from the projection of debris or from their possible interference with moving parts located in the vicinity of the spring.

It is therefore of fundamental importance to equip the gas springs currently used with a secondary safety mechanism that can act in the event of a malfunction of the primary safety mechanisms, and that can avoid reaching the failure of a component.

SUMMARY OF THE INVENTION

The main aim of the invention is to overcome the above-mentioned drawbacks of the prior art.

Specifically, an aim of the invention is that of providing a gas spring equipped with a safety system which intervenes if a safety value relative to one or more operating parameters is exceeded.

These parameters can be, for example, the maximum and/or minimum allowable extension of the spring stroke.

In addition, another aim of the invention is to overcome the problems of pressure increase and oil suction, caused by the depression that is established in the cavities inside the spring during compression.

Finally, an aim of the invention to provide a gas spring which is easy to manufacture and install.

The object of the invention is therefore a gas spring equipped with a safety system comprising a guide equipped with an outer surface, a slider, which defines with the guide at least one chamber containing pressurised gas and which is slidingly connected to it, in such a way as to have a minimum stroke, of expansion, wherein the guide is partially extracted from the slider, and a maximum stroke, of compression; the spring further comprises a bushing, arranged between the slider and the guide, comprising sealing means for the tightness of the chamber and removably coupled and in such a way as to move integrally with the slider up to the maximum stroke, in such a way that, when the slider slides with respect to the guide beyond the maximum stroke, the bushing decouples from the slider, so as to eliminate the tightness of the chamber.

According to preferred embodiments, the slider has a groove formed on its inner surface, while the bushing has a slot facing the groove, in such a way as to provide a seat in which a locking element is housed; when the slider slides with respect to the guide beyond the maximum stroke of compression, the reciprocal position of the slot with respect to the groove changes, in such a way that the locking element comes out of the seat so as to decouple the bushing from the slider, eliminating the tightness of the chamber.

Furthermore, the groove may have a first margin, near a first opening of the first chamber of the slider, and a second margin, tapered in the opposite direction to the first margin, so as to cause the locking element to move out of its seat when the bushing slides with respect to the slider.

In this case, the bushing has a lower surface which protrudes from the first opening of the first chamber at least by half the width of the section of the locking element, in such a way as to ensure its displacement from the groove to cause the decoupling of the bushing and the elimination of the tightness of the chamber.

According to further preferred embodiments, the spring can comprise a safety element to prevent the slider from disengaging itself from the guide when the slider slides beyond the minimum stroke of expansion.

Optionally, this safety element can be arranged in such a way as to project from the outer surface of the guide.

In addition, the guide can have a circular seat in correspondence with the outer surface, while the safety element can be a Seeger or a stop ring, housed in the circular seat so as to protrude with respect to the outer surface of the guide.

The guide can also have a second opening and the safety element can be arranged on the outer surface of the guide and at the second opening.

According to further embodiments, the bushing comprises a lip on a relative inner surface, which is designed to interfere with the safety element when the slider reaches the minimum stroke.

In addition, the spring can comprise an end stop having a stem, which is integral with the slider and constrained to slide through a second opening of the guide, and a head, inserted inside the guide and configured to abut with an abutment defined by the second opening, so as to prevent separation between the slider and the guide.

Finally, the spring can comprise means for sealing the chambers and/or guiding means for the reciprocal sliding of the guide with the bushing, positioned between the bushing itself and the guide and/or between the bushing and the slider.

BRIEF DESCRIPTION OF THE SEVERAL VIEWS OF THE DRAWINGS

The invention is described, by way of example and without limiting the scope of the invention, with reference to the accompanying drawings, in which:

FIG. 10 shows a section of the spring of FIG. 7 at the end of the compression phase;

FIG. 11 shows a section of the spring of FIG. 7 in over-stroke during the compression phase;

FIG. 12 shows a section of a detail of the spring of FIG. 11;

FIGS. 14A, 14B and 14C are sectional views of a third embodiment of the safety system according to the invention applied to a traditional gas spring.

DESCRIPTION OF SPECIFIC EMBODIMENTS OF THE INVENTION

The similar parts will be indicated in the various drawings with the same numerical references.

Figure 1:
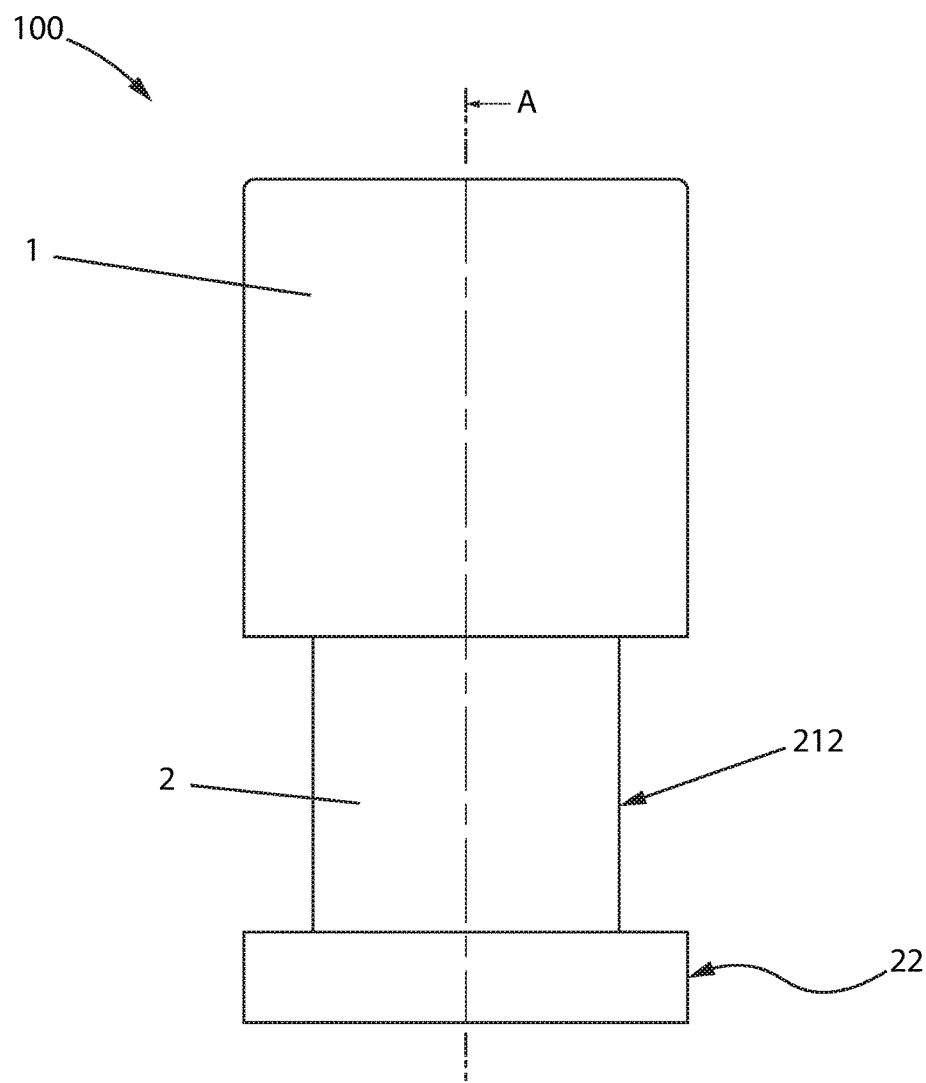
FIG. 1 is a front view of a first embodiment of a gas spring according to the invention.
Figure 2:
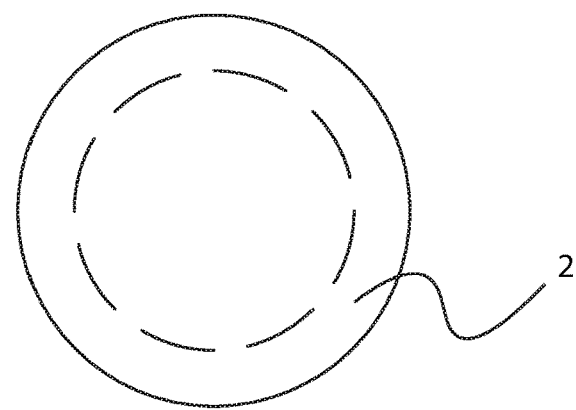
FIG. 2 is a plan view of the spring of FIG. 1.
Figure 3:
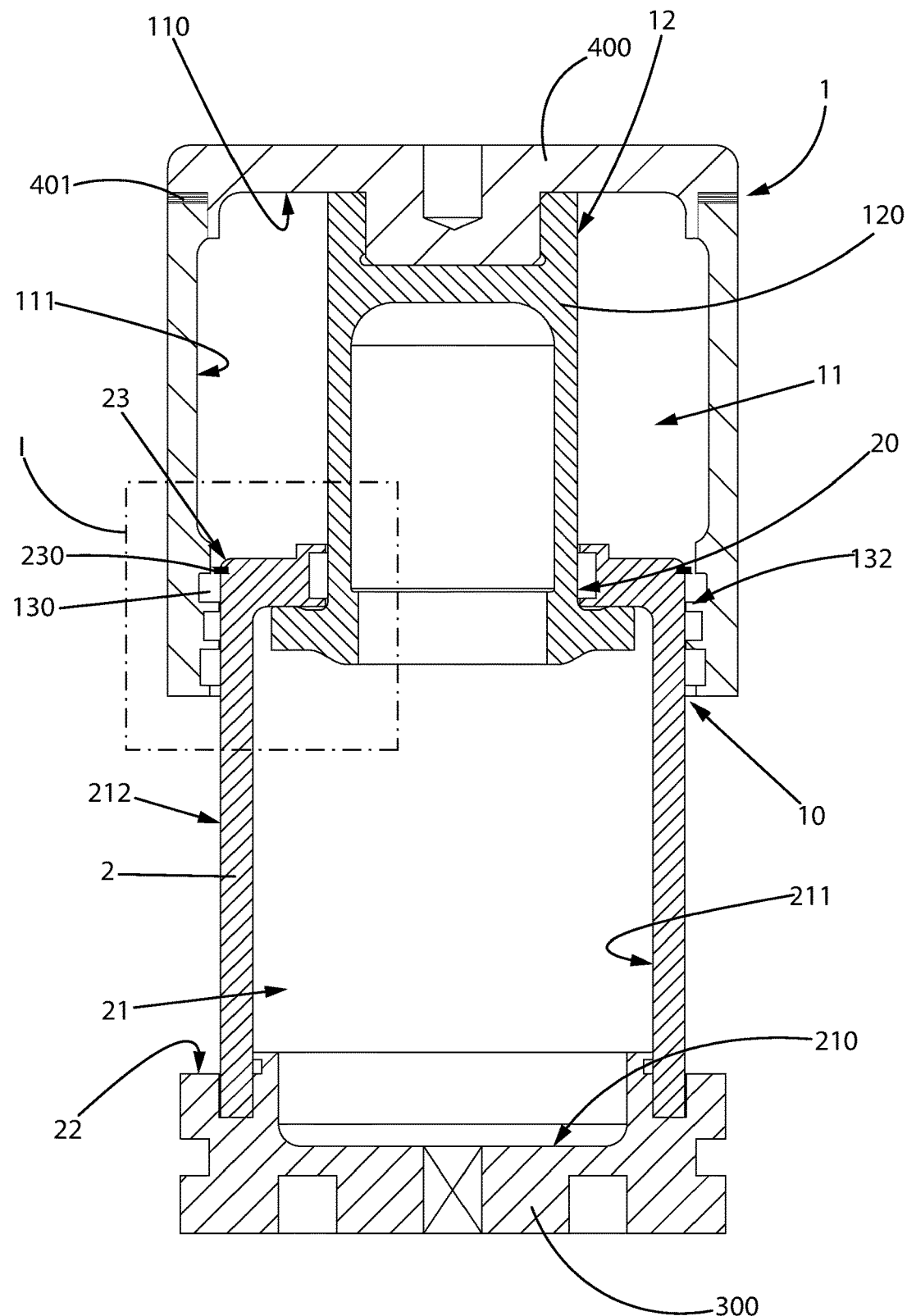
FIG. 3 shows a view of a section along line A-A of the gas spring of FIGS. 1 and 2.

With reference to FIGS. 1-3, the gas spring according to the invention, generically indicated with 100, comprises a first hollow element or slider 1 in which a first chamber 11 is formed, delimited by a first bottom wall 110, by an inner lateral surface 111 and by a first opening 10.

The first bottom wall 110 is part of a closing element 400, which is necessary in this embodiment to allow the assembly of the components that form the spring 100, as will be described in more detail below.

The sealing of the closing element 400 with the body of the slider 1 is ensured by a gasket 401 positioned at their interface.

The spring 100 also comprises a second element or guide 2, which is also hollow and provided with a second chamber 21 delimited by a second bottom wall 210, by a second inner lateral surface 211 and by a second opening 20.

This bottom wall 210 is part of a reversibly coupled disk 300 which is assembled to the guide 2 at a later time, so as to keep the second chamber 21 accessible until the spring 100 is completely formed.

According to this first embodiment, the inner lateral surface 111 of the slider 1 is in contact at least partially with an outer surface 212 of the guide 2, almost always by means of gaskets or other accessory elements (not shown), such as for example the so-called guide-stem or scraper-stem.

The guide 2 is provided, at its opposite end to the opening 20, with a safety stop 22 (FIG. 3) on the outer surface 212 which delimits the chamber 21; in this case, this safety stop 22 is the support base of the spring, which has an upper surface 220.

The slider 1 and the guide 2 are manufactured in such a way that the guide 2 can be inserted into the slider 1 and can slide inside the chamber 11, only for the two configurations of maximum and minimum extension.

Figure 4:
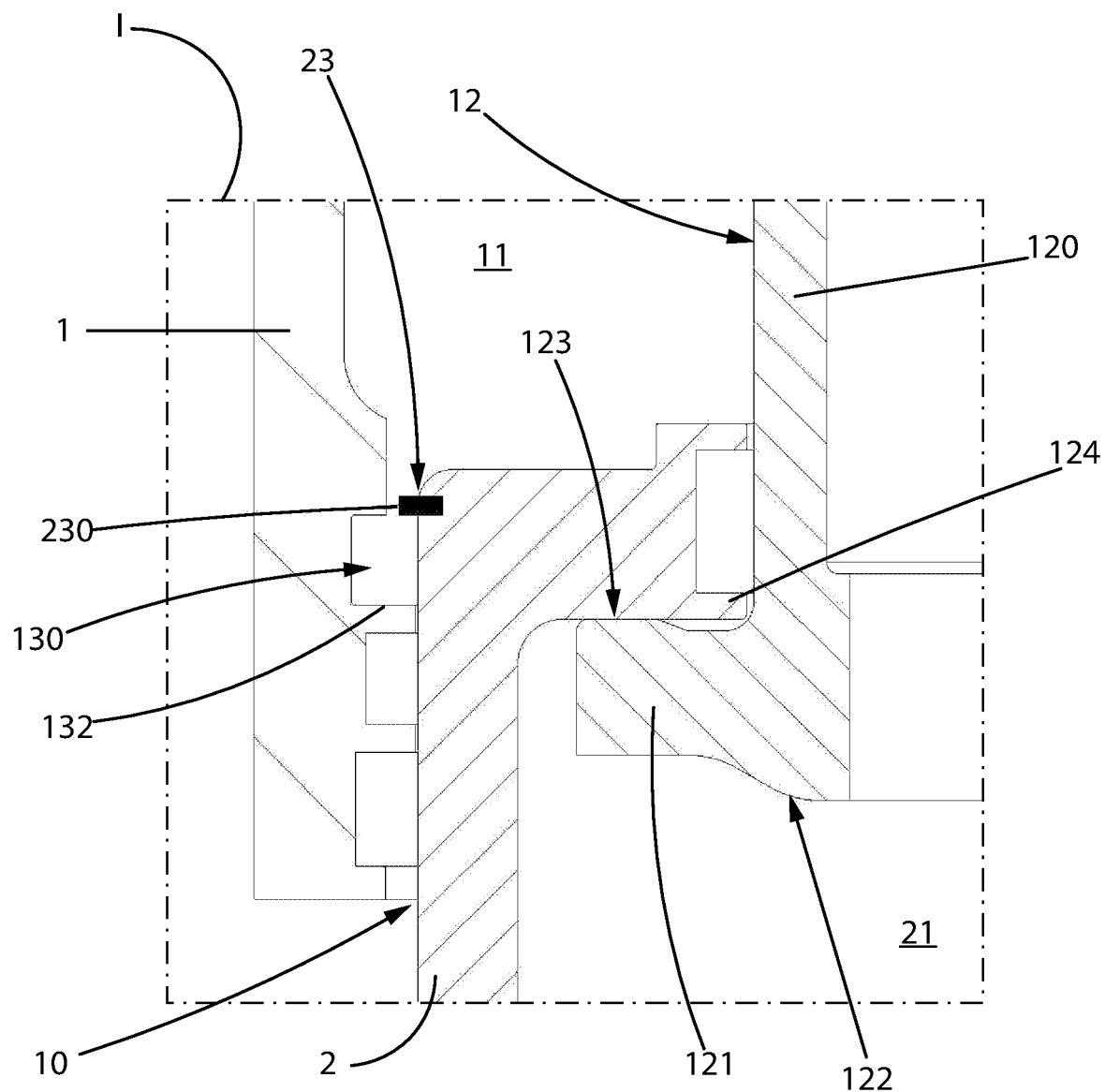
FIG. 4 shows a detail of the section of FIG. 3.
Figure 5:
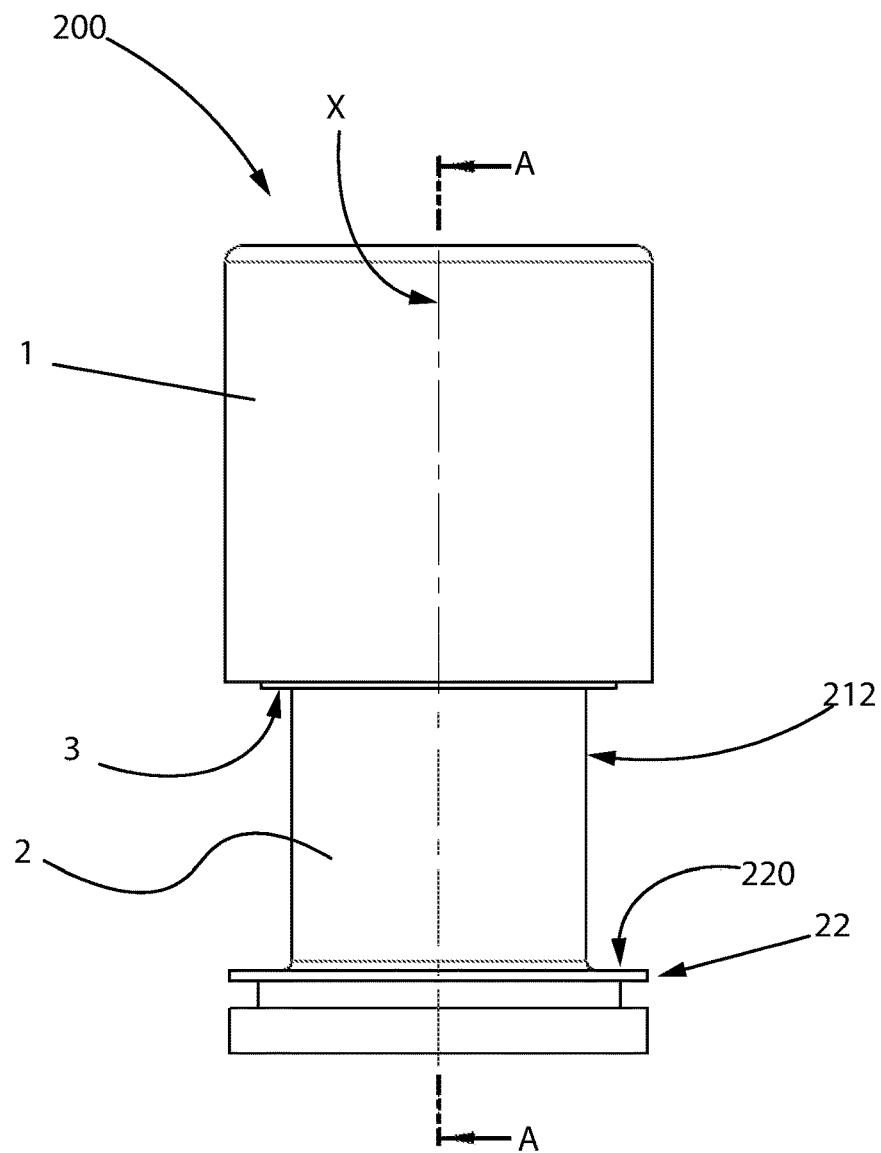
FIG. 5 is a front view of a second embodiment of the gas spring according to the invention.
Figure 6:
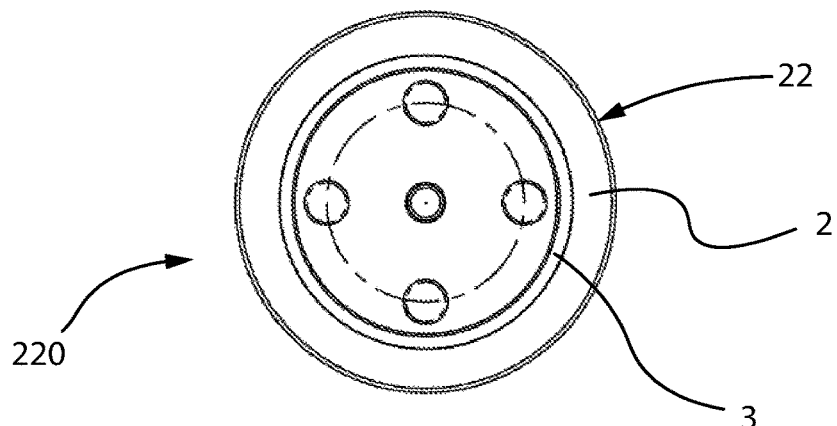
FIG. 6 is a plan view of the spring of FIG. 5.
Figure 7:
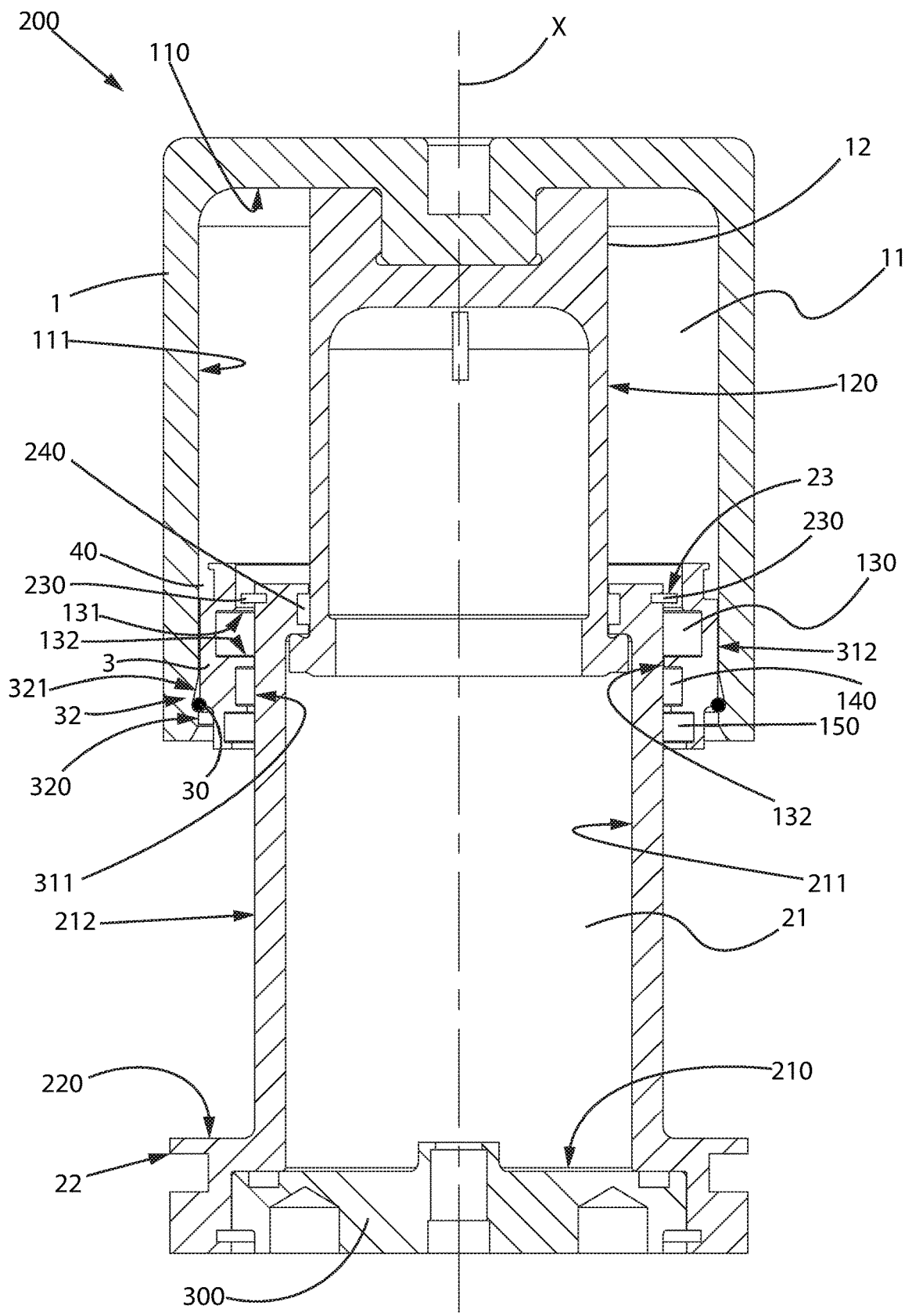
FIG. 7 shows a view of a section along line A-A of the gas spring of FIGS. 5 and 6.
Figure 8:
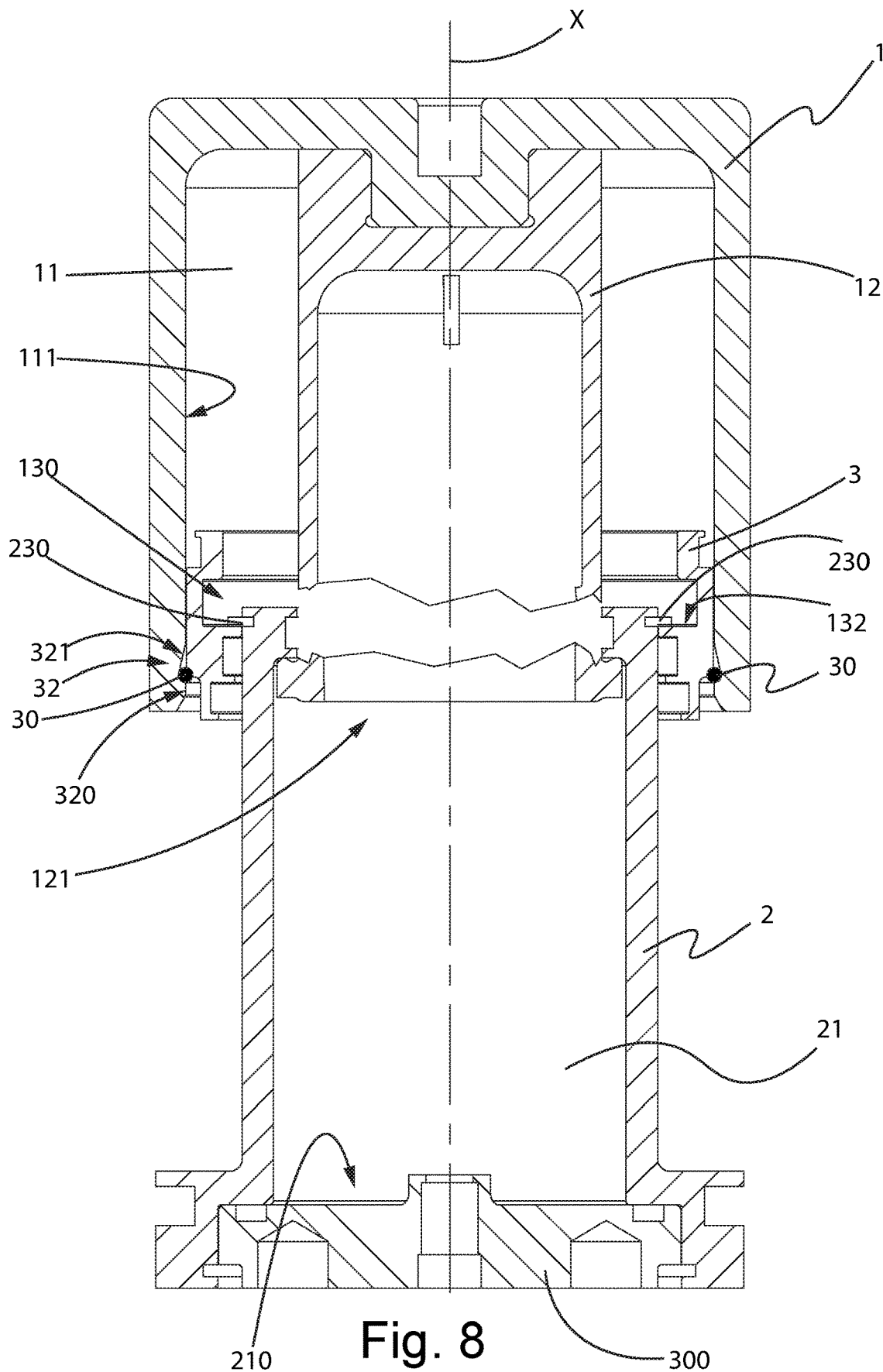
FIG. 8 shows a section of the spring of FIG. 7 in over-stroke during the expansion phase.
Figure 9:
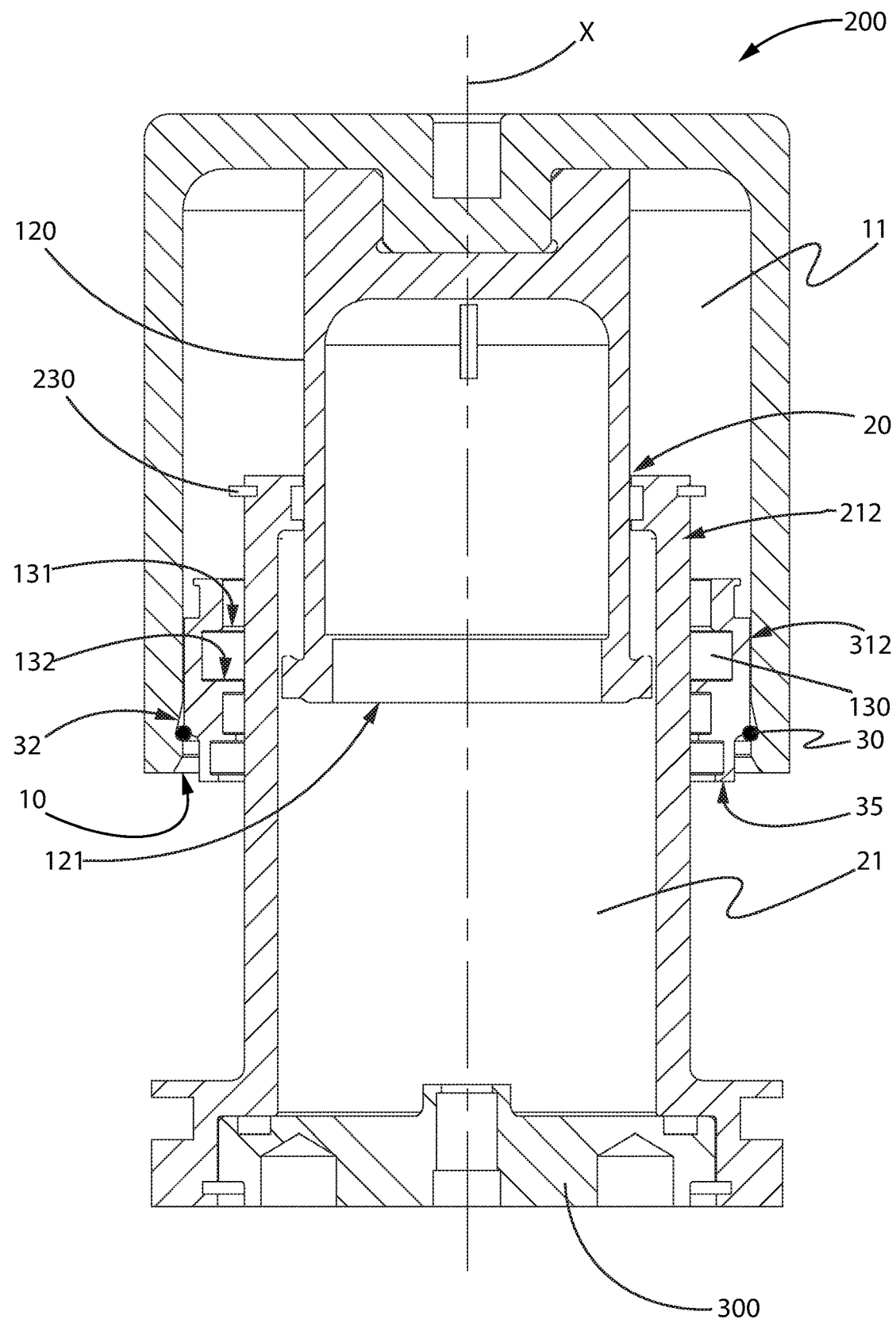
FIG. 9 shows a section of the spring of FIG. 7 during the compression phase.

With reference now to FIGS. 3, 4 and 8, a first housing 130, used for example to house a gasket, is formed along the perimeter of the inner lateral surface 111 of the chamber 11 and in the vicinity of the first opening 10; nevertheless, according to further variant embodiments of the spring, a greater number of housings for further accessories can be provided.

The housing 130 is delimited, in its portion facing the opening 10 of the chamber 11, by a lower projecting profile or lower lip 132 with respect to the inner lateral surface 111 (visible in FIG. 4).

A circular seat 23 is formed on the outer surface 212 of the guide 2 near the opening 20.

This circular seat 23 is used to house a first safety element 230, such as a conventional stop ring.

The spring 100 additionally comprises an end stop 12, for example a piston, positioned inside the first chamber 11 and integral with the slider 1.

This end stop 12 is provided with a stem 120 fixed to the bottom wall 110 of the chamber 11, and with a head 121, with a larger diameter than the stem 120 and which is inserted inside the second chamber 21 of the guide 2.

The stem 120 is constrained inside the second opening 20.

The head 121 has an upper surface 122 and a lower surface 123.

In this way, in the slider 1-guide 2 system the two sliding elements are constrained to translate along the direction of a axis of symmetry X of the spring 100.

The head 121, and in particular its lower surface 123, is used to prevent the two elements from sliding relative to each other until they are released.

For this purpose, the inner walls 211 of the chamber 21 have a smaller bore (or internal diameter) section at the opening 20, which has a first abutment surface or step 124 which extends along the entire periphery of the opening 20.

During the operation of the spring, this abutment surface 124 acts as an upper limit to the relative sliding of the elements 1 and 2; the lower surface of the head 121 of the end stop 12, abutting the step 124, stops the expansion of the spring, and therefore its movement in the axial direction.

Observing the above-mentioned circular seat 23, its position on the outer surface 212 is such that, when the spring is in normal operating conditions, the safety element 230 housed in the circular seat 23 does not interfere with the sliding of the slider 1.

The head 121 of the end stop 120 in fact prevents the slider 1 from rising freely, avoiding contact between the projecting profile 132 and the safety element 230 located in the circular seat 23.

When this is not the case, for example due to fractures of the internal spring components, the stroke range exceeds the maximum allowable limit.

The safety element 230 located in the circular seat 23, comes into contact with the lip 132 after the slider 1 exceeds the minimum stroke, bringing the sealing means in such a position as to no longer guarantee the tightness between the guide 2 and the slider 1.

In this way, the drawback of the prior art is avoided, according to which the breakages of hidden components of the springs may not be immediately evident and remain dangerously hidden for a more or less long period of time before reaching failure.

With reference to FIGS. 5-13, a second embodiment of the gas spring according to the invention is now described.

The equivalent parts and components in the different embodiments represented and/or described are identified by the same references.

The spring 200 shown in FIGS. 5-8 comprises a cylinder or slider 1 and a piston or guide 2 in the same configuration as the first embodiment.

The embodiment of the spring 200 also comprises an end stop 12, similar to that present in the variant described above.

On the inner lateral surface 111 of the slider 1, near the opening 10, a groove 32 is formed, delimited by a first margin or lower margin 320 and a second margin or upper margin 321, the profiles of which are asymmetrical to each other.

The lower margin 320 is, in fact, a traditional shoulder.

The upper margin 321, on the other hand, has a profile slightly tapered towards the inside of the chamber 11; in other words, the diameter of the inner side wall 111 gradually increases as the surface of the groove 32 is moved away from the bottom wall 110 and approaches the opening 10.

An initially flared profile is thus obtained, which however ends with the shoulder represented by the lower margin 320.

Furthermore, according to this embodiment of the spring, the diameter of the first opening 10 is greater than in the first embodiment described, to allow the introduction of a bushing 3 into the clearance which consequently is created between the inner lateral surface 111 of the slider 1 and the outer surface 212 of the guide 2.

In the first case, the chambers 11 and 21 are in communication, and this advantageously allows the inner sealing surface of the spring to be increased and the pressure values to be significantly lowered during operation, thus improving the safety of the spring itself.

The inner surface or wall 311 of the bushing 3 is in contact with the outer surface 212 of the guide 2, and is provided with a plurality of housings:
- a first housing 130, delimited in its portion facing the bottom wall 110 by a first projecting profile or lip 131, and in its portion facing the opening 10, by a second projecting profile or lip 132;
- a second housing 140 and a third housing 150, placed side by side with the first housing 130 and placed at a variable distance according to the design requirements.

These housings are also used to house accessory components (not shown) such as sealing means for the gas, guides to facilitate and guide the sliding between the elements, scraping means for cleaning the exposed surfaces and/or for their protection from attack by dust or external agents.

The profiles 131, 132 of the bushing 3 have the same function of upper limit to the stroke existing between the sliding elements 1 and 2, which is shown more clearly in FIG. 8.

The outer surface or wall 312 of the bushing 3, on the other hand, is in contact with the inner lateral surface 111 of the slider 1.

The following are formed on the outer surface 312:
- a fourth housing 40, designed to house suitable sealing means (not shown) with the inner lateral surface 111 of the slider 2, which prevent the gas from escaping from the chamber 11;
- a fifth housing 31, delimited at the bottom by the lower surface 35 of the bushing 3 itself and at the top by a joint or by a chamfer, the profile of which ends with a slot 310. The bushing 3 is coupled to the slider 1 itself near the opening 14, and is manufactured in such a way that its slot 310 and the groove 32 of the slider 1 are mutually adjacent and facing each other.

In this way, the slot 310 and the groove 32 together define a seat in which to house a locking element 30, which makes the bushing 3 integral with the slider 1; such locking means can be, for example, a harmonic or elastic steel ring.

During normal operation of the spring 200, in fact, the pressure of the gas contained inside the chamber 11 would push the bushing 3 in the direction of the opening 10, and would cause the separation from the slider 1.

The presence of the locking element 30, which is in fact trapped by the lower margin 320 of the groove 32 and by the slot 310, integrally locks the bushing 3 and the slider 1.

Advantageously, the locking element 30 can be of reduced size with respect to the prior art, since it is not subjected to dynamic loads during the operation of the spring and only serves to keep two elements coupled together.

Prior art technical solutions make use of larger sized rings or threaded elements, in order to be able to withstand the high pressure stresses that can develop.

Therefore, this variant of gas spring behaves during use in a conventional manner.

In the event of an over-stroke in the expansion phase, the safety mechanism already illustrated in the previous description of the first embodiment intervenes, the operation of which is shown in FIG. 8.

It is also possible to make springs without this first safety mechanism, if necessary.

With reference to FIGS. 9 to 13, the operation of the second embodiment of the safety device according to the invention is now illustrated, in the case of over-stroke during the compression phase of the spring and in correspondence with the so-called bottom dead centre configuration.

As already mentioned, during the conventional use of gas springs it is preferable that the two main sliding elements do not come into contact with each other.

This is achieved, for example, through a careful adjustment of the movements of the elements with which the spring itself interacts, so as not to cause excessive stresses that lead to excessive compression and, therefore, to unwanted contact between the components of the spring itself.

As can be seen in FIGS. 7 to 13, the bushing 3 is manufactured in such a way that its lower surface 35 protrudes slightly along the axial direction with respect to the opening 10 of the slider 1.

In other words, the lower surface 35 protrudes slightly out of the opening 10, towards the stop 22 of the guide 2, which in this case also functions as a support base on a reference surface (not shown).

The extent of the protrusion is minimal, and is sufficient to cause, in the event of over-stroke, the contact of the lower surface 35 of the bushing 3 with the guide 2, specifically with the upper surface 220 of the stop 22 (as shown in FIGS. 10 and 11).

This contact in turn causes a relative translation between the slider 1 and the bushing 3; in particular, it generates a movement along the direction of the X axis of the bushing 3 towards the bottom wall 110 of the slider 1.

In this way the upper marge 321 of the groove 32 moves and, due to its tapering, forces the locking element 30 to leave its natural seat, represented by the slot 310 (as shown in detail in FIG. 12).

The locking element 30 is therefore pushed in the same direction as the movement of the slider 1, and occupies the fifth housing 31 in an irreversible manner, due to the elasticity of the material with which the locking element 30 is manufactured.

According to preferred embodiments, the above-mentioned lower surface 35 of the bushing 3 protrudes from the first opening 10 of the first chamber 11 to an extent at least equal to half the sectional width of the locking element 30, so as to ensure its movement from the groove 32.

The displacement is shown more clearly in the detail of FIG. 12, in wherein the contraction of the locking element 30 is schematically shown with the arrow F.

At this point, due to the clearance that is established between the slider 1 and the bushing 3, the gasket positioned in the housing 40 no longer forms a complete seal with the walls 111, causing the gas to escape from the chamber 11.

Therefore, a loss of pressure is obtained inside one or both chambers, and it becomes possible to detect the contact between the surfaces of slider 1 and guide 2.

Figure 13:
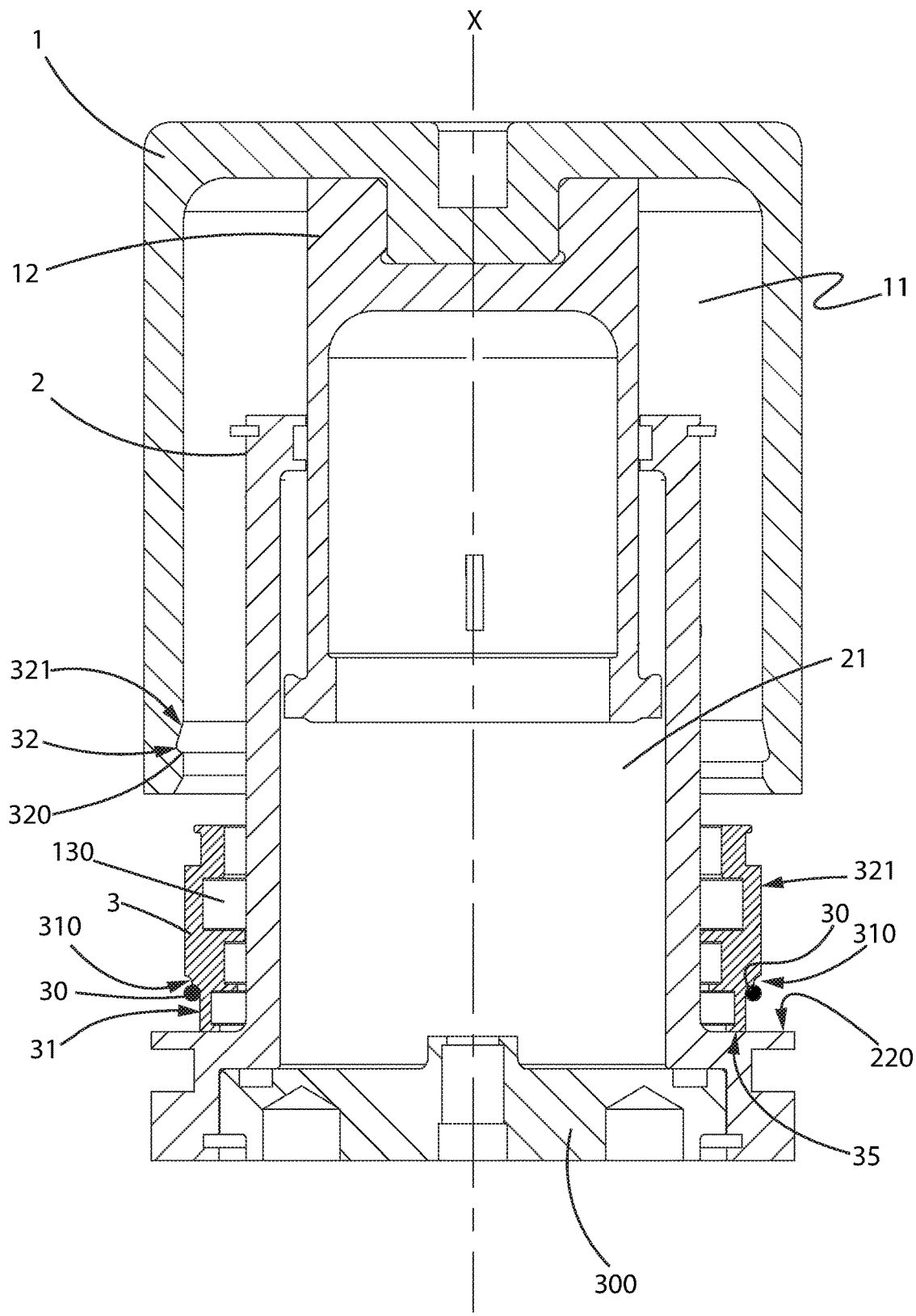
FIG. 13 shows a section of the spring of FIG. 11 following the over-stroke occurring during the compression phase, with consequent decoupling of the bushing.

FIG. 13 shows the spring 200 after the locking element 30 has changed position, releasing the bushing 3 from the slider 1.

The particular shape of the housing 31 of the bushing 3, together with the elastic material with which the locking element 30 is made, does not allow the latter to spontaneously return to occupy its original position in the slot 310.

The locking element 30 undergoes a movement from the seat 310 by the upper margin 321 of the groove 32; at the same time, the locking element 30 contracts elastically, consequently reducing its diameter.

The movement of the locking element 30 continues to such an extent that it permanently occupies the housing 31.

The slider 1 is released from the bushing 3, and causes the total loss of tightness of the gaskets, releasing the gas contained inside the chambers.

Consequently, the spring cannot continue to be used in conditions of potential risk for its integrity, and can therefore be readily identified and replaced.

This avoids inadvertently prolonging the use of damaged springs and/or in any case close to fracture, avoiding accidents that may derive from this incorrect practice and the potentially harmful consequences.

FIGS. 14A-14C show a further embodiment of the safety system according to the invention applied to a type of gas springs already present on the market.

This embodiment provides a structure substantially identical to those already described, but which is used in an inverted configuration.

For this reason, in order to facilitate the reading, the components of the latter embodiment are identified with the same references used previously, and have substantially the same functions.

In fact, the slider 1 and the guide 2 are always constrained to slide reciprocally, while the bushing 3 is constrained to the slider 1 in an intermediate position between it and the guide 2.

The chamber 11 containing the gas is defined by the slider 1, the bushing 3 and the guide 2, which consists solely of a piston equipped with a stem 120 and a head 121.

In this simplified embodiment, therefore, the guide 2 lacks the outer protection and containment walls present in the other embodiments.

The hermetic seal of the chamber 11 is ensured by seals (not shown) which can be inserted in the housings 40 and 130.

In addition, further housings may be provided for means for guiding and/or cleaning the stem 120 which may be necessary.

The structure and operation of the safety system of the spring according to this variant, in case of exceeding the length of the stroke of the spring in the compression phase, are substantially identical to what has been described up to now.

As occurs in the embodiments described above in the event of unwanted contacts of external elements with the guide 1 (for example press surfaces or the like), the surface 35 of the bushing 3, projecting with respect to the first opening 10, is pushed towards the inside of the chamber 11.

The shape of the groove 32 means that the locking element 30, which normally prevents the bushing 3 from disengaging itself from the guide 1, leaves the seat to which it belongs following the movement of the bushing 3 itself, and can no longer keep the two elements 1 and 2 locked.

Consequently, with the displacement of the bushing 3, the tightness of the chamber 11 is lost, and the total escape of the gas renders the spring useless.

The invention is described by way of example only, without limiting the scope of application, according to its preferred embodiments, but it shall be understood that the invention may be modified and/or adapted by experts in the field without thereby departing from the scope of the inventive concept.

The invention claimed is:

1. A gas spring, comprising:
   a guide, having an outer surface,
   a slider,
      defining with said guide at least one chamber containing pressurised gas,
   said slider being slidably constrained to said guide so as to have a minimum stroke of expansion, in which said guide is partially extracted from said slider, and a maximum stroke, of compression, said slider having a groove formed on its inner surface, said groove having a first margin near a first opening of said chamber and a second margin tapered in an opposite direction to said first margin;
      a bushing, arranged between said slider and said guide, comprising sealing means for providing a fluid-tight seal of said chamber, said bushing having a slot facing said groove and a lower surface that protrudes from said first opening of said chamber at least by half the width of the section of a locking element;
      said locking element housed in a seat defined by said groove and said slot, said locking element coupling said bushing to move integrally with said slider up to said maximum stroke of compression;
      wherein when said slider slides with respect to said guide beyond said maximum stroke of compression, said lower surface of said bushing contacts said guide causing said bushing to move relative to said slider such that said tapered second margin forces said locking element out of said seat to cause decoupling of said bushing from said slider and eliminate said fluid-tight seal of said chamber;
      a stop ring positioned to prevent said slider from disengaging from said guide when said slider slides beyond said minimum stroke of expansion;
      wherein said guide has a circular seat in correspondence with said outer surface; and
      wherein said stop ring is housed in said circular seat so as to protrude with respect to said outer surface of said guide.

2. The gas spring, according to claim 1, wherein said stop ring is arranged so as to protrude from said outer surface of said guide.

3. The gas spring, according to claim 1, wherein said stop ring is arranged on said outer surface of said guide in correspondence with said second opening.

4. The gas spring, according to claim 1, wherein
   said bushing comprises a lip on a relative inner surface, designed to interfere with said stop ring when said slider reaches said minimum stroke.

5. The gas spring according to claim 1, it comprising:
   an end stop comprising
      a stem, integral with said slider and constrained to slide through the second opening of said guide, and
      a head, inserted inside said guide and configured to abut with a stop defined by said second opening, so as to prevent separation between the slider and the guide.

6. The gas spring according to claim 1, comprising:
   at least one of a fluid-tight sealing of the chambers (11, 21) and guiding means for the reciprocal sliding of said guide with said bushing, positioned at least between said bushing and said guide or between said bushing and said slider.

* * * * *